United States Patent
Mehlos et al.

(10) Patent No.: US 10,549,858 B2
(45) Date of Patent: Feb. 4, 2020

(54) SEAT PAN FOR AN AIRCRAFT

(71) Applicant: The Boeing Company, Chicago, IL (US)

(72) Inventors: James P. Mehlos, Seattle, WA (US); Tony Bravetti, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 17 days.

(21) Appl. No.: 16/001,037

(22) Filed: Jun. 6, 2018

(65) Prior Publication Data

US 2019/0375509 A1 Dec. 12, 2019

(51) Int. Cl.
B64D 11/06 (2006.01)

(52) U.S. Cl.
CPC ...... B64D 11/0639 (2014.12); B64D 11/0606 (2014.12); B64D 11/0698 (2014.12)

(58) Field of Classification Search
CPC ............ B64D 11/0639; B64D 11/0606; B64D 11/0698; B64D 11/0641
See application file for complete search history.

(56) References Cited

U.S. PATENT DOCUMENTS

| | | | |
|---|---|---|---|
| 6,170,786 B1 * | 1/2001 | Park | B60N 2/0232 248/274.1 |
| 6,227,489 B1 * | 5/2001 | Kitamoto | B64D 11/00 244/118.5 |
| 6,715,716 B1 * | 4/2004 | Cheung | B64D 11/06 105/316 |
| 7,178,871 B1 | 2/2007 | Round et al. | |
| 7,578,551 B2 * | 8/2009 | Linero | A47C 1/122 297/107 |
| 7,918,504 B2 | 4/2011 | Thompson | |
| 8,011,723 B2 * | 9/2011 | Park | B60N 2/345 244/118.6 |
| 8,028,958 B2 * | 10/2011 | Kneller | B64D 11/0601 244/118.6 |
| 9,359,079 B2 * | 6/2016 | Scott | B64D 11/0601 |
| 10,081,428 B2 * | 9/2018 | Clucas | B64D 11/0636 |
| 2005/0077761 A1 | 4/2005 | Dryburgh et al. | |
| 2007/0164157 A1 * | 7/2007 | Park | B60N 2/34 244/118.6 |
| 2013/0032668 A1 | 2/2013 | Foucher et al. | |
| 2016/0297534 A1 * | 10/2016 | Lee | B64D 11/0601 |
| 2017/0327232 A1 * | 11/2017 | Morgan | B64D 11/0646 |
| 2018/0281969 A1 * | 10/2018 | Lee | B64D 11/0601 |
| 2019/0210733 A1 * | 7/2019 | Herault | B64D 11/0601 |

* cited by examiner

*Primary Examiner* — Philip F Gabler
(74) *Attorney, Agent, or Firm* — McDonnell Boehnen Hulbert & Berghoff LLP

(57) ABSTRACT

An example seat pan for an aircraft includes a first portion having a first end and a second portion that is adjacent to the first portion and is adjustable to be in a first position in which the second portion forms a seating surface together with the first portion, the seating surface having a width that is wider than a width of the first end of the first portion. The second portion is adjustable to alternatively be in a second position in which the first end of the first portion extends beyond the second portion to be insertable into a footwell.

20 Claims, 17 Drawing Sheets

SEAT PAN FOR AN AIRCRAFT

FIELD

The present disclosure generally relates to a seat pan for an aircraft, and more specifically to a seat pan having a first portion and a second portion that is adjustable to either form a seating surface with the first portion or to allow for the first portion to be insertable into a footwell.

BACKGROUND

Increasing the density of passenger seats on a commercial aircraft can increase the amount of revenue that an airline can generate on a per flight basis, if the additional seats are sold. One way to increase seating density involves reducing the dimensions of the seats themselves. Another way to increase seating density involves reducing the space between adjacent seats. However, both of these techniques can reduce passenger comfort and demand for such seating, which can work against the goal of increased revenue. For example, passengers might find it intolerable if adjacent seats are placed too close together or if the seats themselves are too small. This might be especially true for "business class" passengers who presumably are willing to pay a premium for increased comfort and convenience. Additionally, there is a limit to how dense seating can be based on the size of the passengers. Thus, in many situations, it might be difficult to increase revenue by increasing seating density.

Airlines can also increase revenue by increasing the comfort and convenience of existing passenger seating without changing seating density. Many existing business class seat pans have a limited width because the seat pan is sized to slide into a footwell in front of the seat for lay flat capability. Thus, a need exists for a wider seat pan that could make the seat more comfortable and accommodate larger passengers without decreasing seating density or adversely affecting lay flat capability.

SUMMARY

One aspect of the disclosure is a seat pan for an aircraft. The seat pan includes a first portion having a first end and a second portion that is adjacent to the first portion and is adjustable to be in a first position in which the second portion forms a seating surface together with the first portion, the seating surface having a width that is wider than a width of the first end of the first portion. The second portion is adjustable to alternatively be in a second position in which the first end of the first portion extends beyond the second portion to be insertable into a footwell.

Another aspect of the disclosure is a method for providing a seat pan for an aircraft. The method includes providing a first portion of the seat pan having a first end. The method also includes providing a second portion that is adjacent to the first portion and is adjustable to be in a first position in which the second portion forms a seating surface together with the first portion, the seating surface having a width that is wider than a width of the first end of the first portion. The second portion is adjustable to alternatively be in a second position in which the first end of the first portion extends beyond the second portion to be insertable into a footwell.

A further aspect of the disclosure is a seating system for an aircraft. The seating system includes a footwell and a seat pan. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell.

A further aspect of the disclosure is a method for providing a seating system for an aircraft. The method includes providing a footwell of the seating system and providing a seat pan of the seating system. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell.

Another aspect of the disclosure includes a seating system for an aircraft. The seating system includes a footwell, a seat back, and a seat pan. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell. A width of the first end of the first portion is substantially equal to the width of the footwell and the seating system is configured such that the seat back is substantially parallel with the first portion when the second portion is in the second position.

A further aspect of the disclosure includes a method for providing a seating system for an aircraft. The method includes providing a footwell of the seating system, providing a seat back of the seating system, and providing a seat pan of the seating system. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell. A width of the first end of the first portion is substantially equal to the width of the footwell and the seating system is configured such that the seat back is substantially parallel with the first portion when the second portion is in the second position.

Another aspect of the disclosure includes a method for adjusting a seating system of an aircraft. The method includes moving a seat back of the seating system down toward a floor of the aircraft such that the seat back is substantially parallel with a first portion of a seat pan of the seating system to form a laying surface. The method also includes moving a second portion of the seat pan from a first position to a second position. In the first position, the second portion forms a seating surface together with the first portion, the seating surface having a width that is wider than a width of a footwell of the seating system. A first end of the first portion extends beyond the second portion when the second portion is in the second position. The method also includes moving the first end of the first portion into the footwell.

Another aspect of the disclosure includes a method for adjusting a seating system of an aircraft. The method includes moving a first end of a first portion of a seat pan of the seating system out of a footwell of the seating system and moving a second portion of the seat pan from a second position to a first position. The first end of the first portion extends beyond the second portion when the second portion is in the second position. In the first position, the second portion forms a seating surface together with the first portion, the seating surface having a width that is wider than a width of the footwell. The method also includes moving a seat back of the seating system up and away from a floor of the aircraft.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
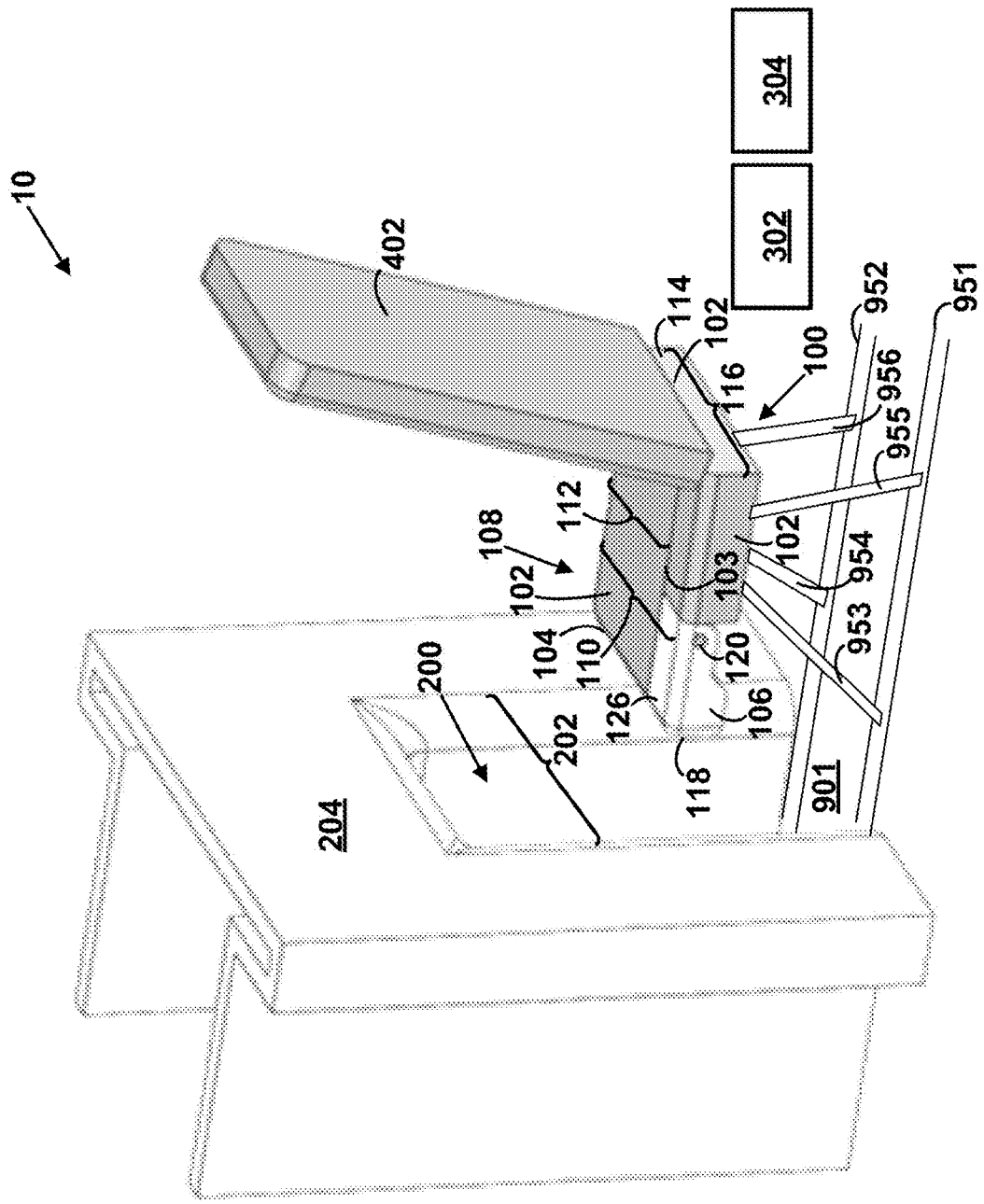
FIG. 1 is a perspective view of a seating system in a first position, according to an example.

As discussed above, there exists a need for wider aircraft seat pans on commercial aircraft that could make seats more comfortable and accommodate larger passengers without decreasing seating density or adversely affecting lay flat capability. Accordingly, such seat pans, seating systems, and associated methods are disclosed herein.

A seat pan for an aircraft includes a first portion having a first end and a second portion that is adjacent to the first portion. The second portion is adjustable to be in a first position in which the second portion forms a seating surface together with the first portion, the seating surface having a width that is wider than a width of the first end of the first portion. The second portion is adjustable to alternatively be in a second position in which the first end of the first portion extends beyond the second portion to be insertable into a footwell.

In the first position, the second portion of the seat pan provides a seating surface with additional width (e.g., over the whole length of the seating surface) for increased comfort while the passenger is in a seated position. When the second portion of the seat pan is the first position, the seat pan is generally not within the footwell and the width of the seat pan can exceed the width of the footwell.

In the second position, the second portion of the seat pan is rotated or otherwise moved away from the first end of the first portion to effectively reduce the width of the seat pan at an end of the seat pan that is closest to the footwell in front of the seat pan. The first end of the first portion of the seat pan can then be inserted into the footwell without having the second portion of the seat pan provide an obstruction. A seat back can be lowered to be substantially parallel with the seat pan to form a laying surface that extends at least partially into the footwell. In the second position, the seat pan might abut a platform within the footwell that provides additional length for the laying surface. By taking advantage of footwell space, this configuration allows for reduced seating density (e.g., a decrease in "pitch" between seats of at least 2 to 4 inches). This might allow for one or more additional rows of seats to be placed within a particular aircraft's cabin. Additionally, the reduced width of the seat pan when the second portion is in the second position generally will not inconvenience the laying passenger because of the additional support provided by the seat back and the platform within the footwell.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a perspective view of a seating system 10 that includes a footwell 200 and a seat pan 100. The seating system 10 is shown in a first position (e.g., an upright seating position).

Figure 2:
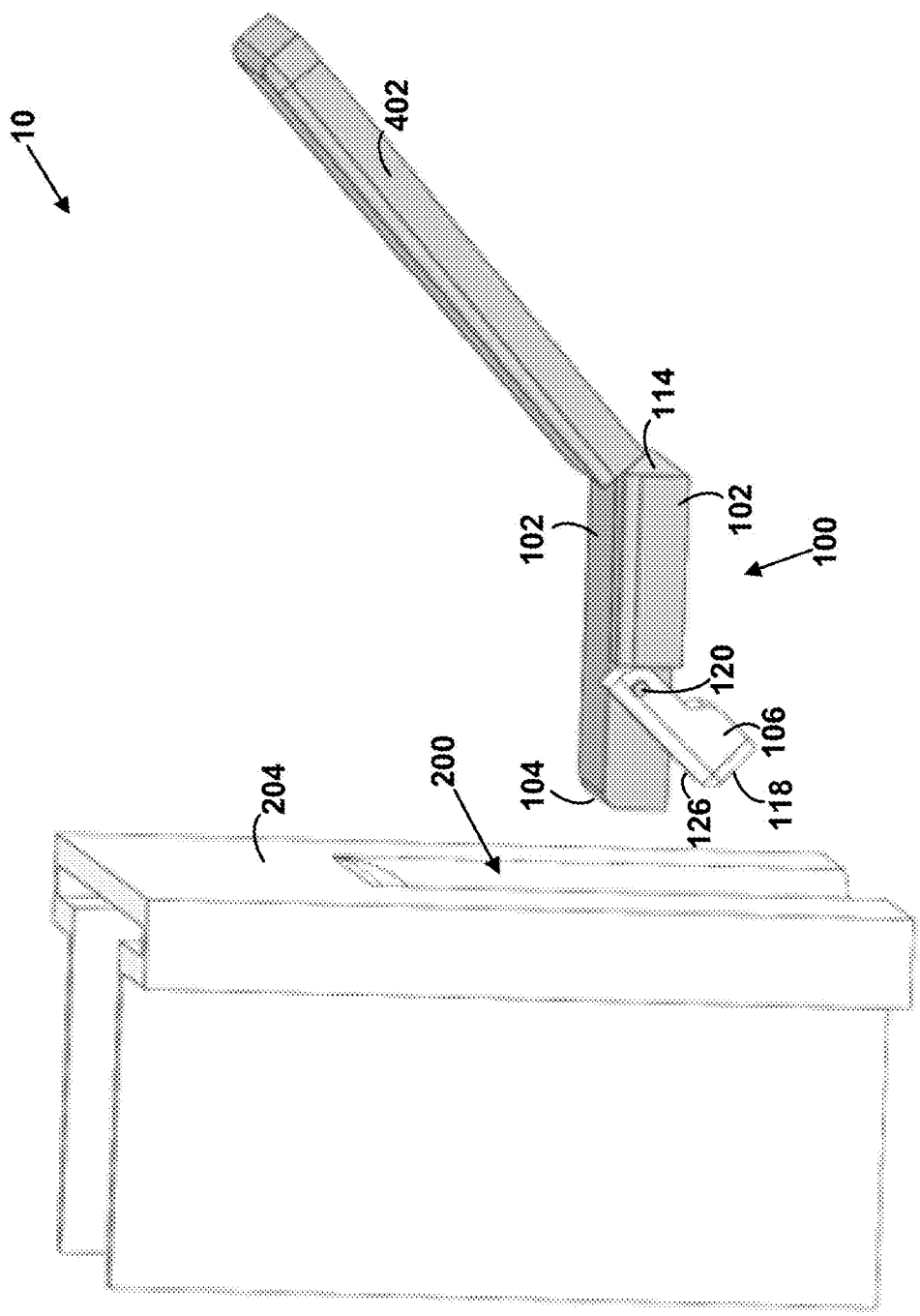
FIG. 2 is a perspective view of a seating system in transition between a first position and a second position, according to an example.

FIG. 2 is a perspective view of the seating system 10 in transition between the first position and a second position (e.g., a lay flat position).

Figure 3:
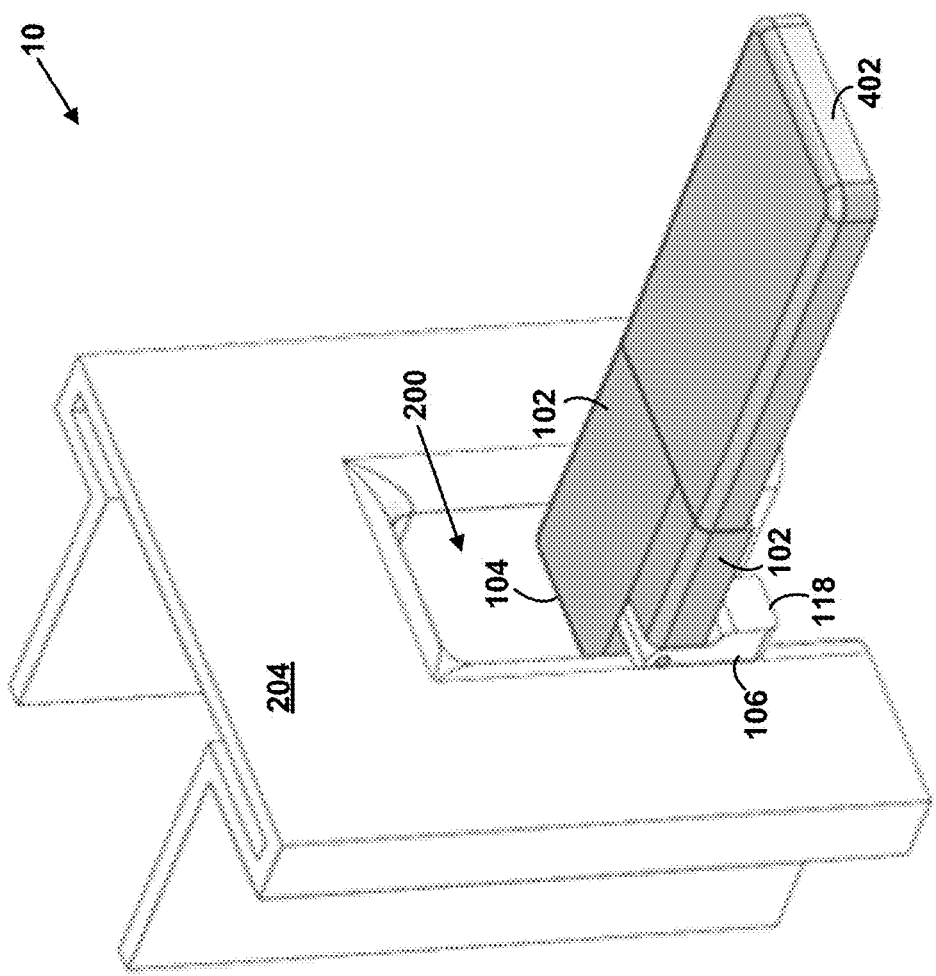
FIG. 3 is a perspective view of a seating system in a second position, according to an example.

FIG. 3 is a perspective view of the seating system 10 in the second position.

Referring to FIG. 1, the seat pan 100 includes a first portion 102 having a first end 104 and a second portion 106 that is adjacent to the first portion 102. The second portion 106 is adjustable to be in the first position (shown in FIG. 1, FIG. 4, and FIG. 7) in which the second portion 106 forms a seating surface 108 together with the first portion 102. The seating surface 108 has a width 110 that is wider than a width 112 of the first end 104 of the first portion 102. The width 110 is also wider than a width 202 of the footwell 200. The second portion 106 is adjustable to alternatively be in the second position (shown in FIG. 3, FIG. 6, and FIG. 9) in which the first end 104 of the first portion 102 extends beyond the second portion 106 to be insertable into the footwell 200.

The first portion 102 can be formed of and/or include plastic, metal, foam cushions, and/or any other material suitable for an aircraft seat. For example, the first portion 102 might include a cushioned upper surface that partially forms the seating surface 108. In the example shown in FIG. 1, the first portion 102 is separated into two sections partitioned by a structural separation 103 (e.g., a seam), but in other examples, such as the example shown in FIG. 15, the first portion 102 does not include the structural separation 103. That is, in the example shown in FIG. 15, the first portion 102 constitutes a single L-shaped portion.

The second portion 106 can be formed of and/or include plastic, metal, foam cushions, and/or any other material suitable for an aircraft seat. For example, the second portion 106 might include a cushioned upper surface that partially forms the seating surface 108 when the second portion 106 is in the first position. In some examples, it might be advantageous for the second portion 106 and the first portion 102 to be formed of and/or include different materials.

FIG. 1 also shows a floor rail 951 and a floor rail 952. The floor rail 951 and the floor rail 952 are both mechanically coupled (e.g., fastened) to a floor 901 of an aircraft 60 (see FIGS. 16 and 17). The floor rail 951 and the floor rail 952 can be formed with metal, plastic, or other materials. The floor rail 951 and the floor rail 952 define respective slots that can receive structural supports of the seating system 10, as described below.

The seating system 10 also includes a structural support 953, a structural support 954, a structural support 955, and a structural support 956. The structural support 953 and the structural support 955 are coupled to the floor rail 951 and the structural support 954 and the structural support 956 are coupled to the floor rail 952. The structural support 953 and the structural support 955 are configured to slide within the floor rail 951 to enable the seating system 10 to transition from the upright seating position to the lay flat position and from the lay flat position to the upright seating position. The structural support 954 and the structural support 956 are configured to slide within the floor rail 952 to enable the seating system 10 to transition from the upright seating position to the lay flat position and from the lay flat position to the upright seating position. The structural support 953, the structural support 954, the structural support 955, and the structural support 956 can take the form of metal struts that are fastened to the first portion 102, for example.

In particular examples, the width 112 of the first end 104 of the first portion 102 is substantially equal to the width 202 of the footwell 200 (e.g., such that the first end 104 can fit snugly within the footwell 200 when the second portion 106 is in the second position).

The first portion 102 has a second end 114 that is opposite the first end 104. A width 116 of the second end 114 is greater than the width 112 of the first end 104.

The seating system 10 also includes a motorized actuator 302 that is configured to move the second portion 106 from the first position to the second position and from the second position to the first position. That is, the motorized actuator 302 is configured to move the seating system 10 from the upright seating position shown in FIG. 1 to the lay flat position shown in FIG. 3, and vice versa.

The motorized actuator 302 can include one or more powered motors and/or other mechanical systems configured to enable the transitions between the upright seating position and the lay flat position. For example, the motorized actuator 302 can include one or more components that are mechanically coupled to a seat back 402 of the seating system 10, the first portion 102, and/or the second portion 106 and are configured to enable transitions between the upright seating position and the lay flat position.

Additionally or alternatively, the seating system 10 includes an unpowered actuator 304 that is configured to move the second portion 106 from the first position to the second position and from the second position to the first position. That is, the unpowered actuator 304 is configured to move the seating system 10 from the upright seating position to the lay flat position, and vice versa.

The unpowered actuator 304 can include one or more mechanical systems (e.g., levers, springs, gears, etc.) configured to enable the transitions between the upright seating position and the lay flat position. For example, the unpowered actuator 304 can include one or more components that are mechanically coupled to the seat back 402, the first portion 102, and/or the second portion 106 and are configured to enable the transitions between the upright seating position and the lay flat position.

As shown in FIG. 1, the footwell 200 is at least partially enclosed and extends above and below the first portion 102 of the seat pan 100. The footwell 200 rests on the floor 901 of the aircraft 60.

As shown in FIGS. 1-3, an end 118 of the second portion 106 is configured to pivot downward away from the first end 104 of the first portion 102 and toward the second end 114 of the first portion 102 as the second portion 106 is adjusted from the first position to the second position.

The seat pan 100 further includes a rod 120 coupled to the first portion 102. The second portion 106 is configured to pivot about the rod 120. In some examples, the rod 120 is embedded within the first portion 102.

In other examples, the second portion is configured to retract away from the first end of the first portion and toward the second end of the first portion as the second portion is adjusted from the first position to the second position. For example, the second portion can be configured to retract rearward into an adjacent section of the first portion.

Figure 4:
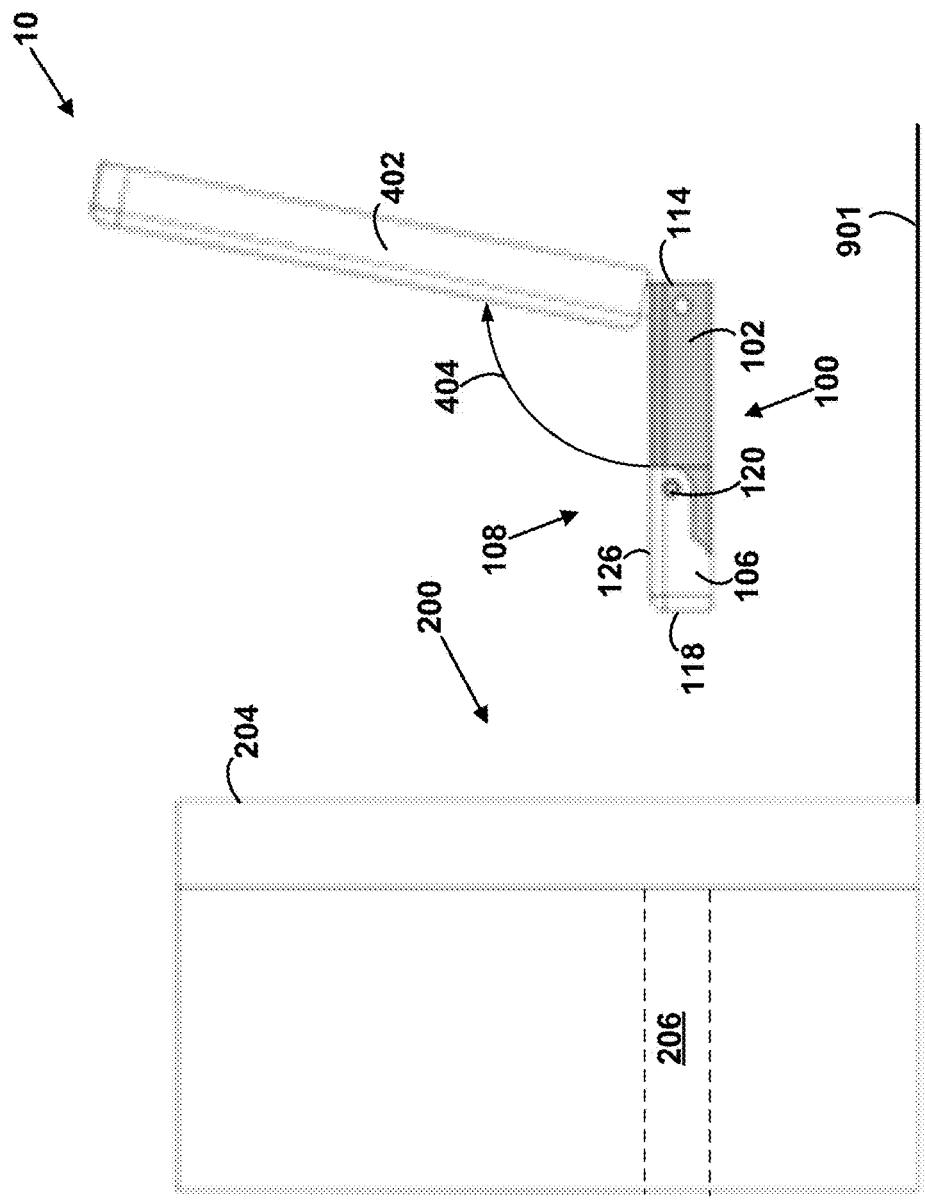
FIG. 4 is a side view of a seating system in a first position, according to an example.

FIG. 4 is a side view of the seating system 10 in the first position. The seat pan 100 is configured such that the seat back 402 forms an obtuse angle 404 with the seating surface 108 when the second portion 106 is in the first position.

Figure 5:
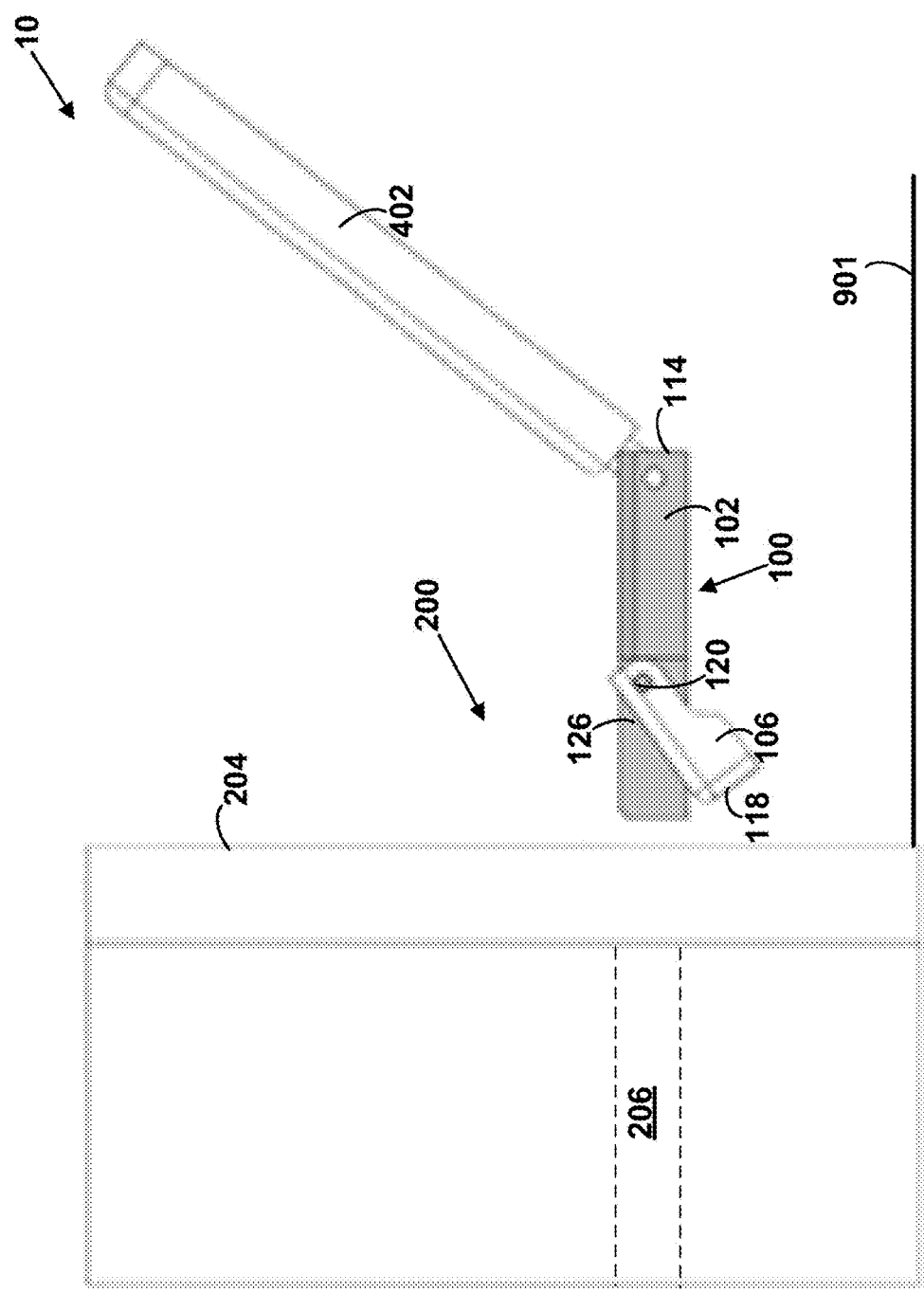
FIG. 5 is a side view of a seating system in transition between a first position and a second position, according to an example.

FIG. 5 is a side view of the seating system 10 in transition between the first position and the second position.

Figure 6:
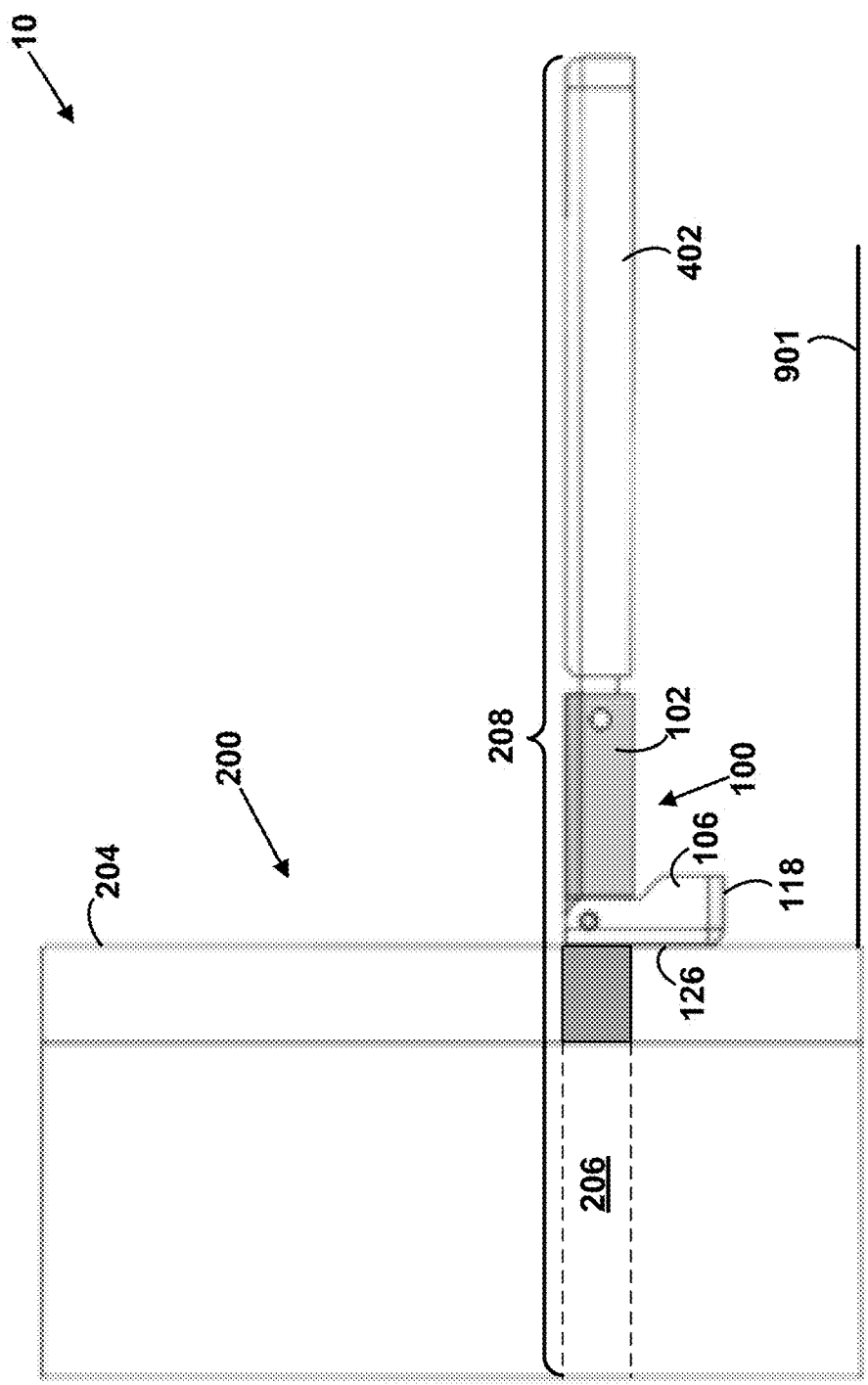
FIG. 6 is a side view of a seating system in a second position, according to an example.

FIG. 6 is a side view of the seating system 10 in the second position. As shown in FIG. 6, a surface 126 of the second portion 106 that forms the seating surface 108 when the second portion 106 is in the first position is substantially perpendicular to the first portion 102 when the second portion 106 is in the second position. The seating system 10 is configured such that the seat back 402 is substantially parallel with the first portion 102 when the second portion 106 is in the second position.

The footwell 200 includes a facade 204 that defines the footwell 200. As shown in FIG. 6, the second portion 106 (e.g., the surface 126) is configured to abut the facade 204 when the second portion 106 is in the second position (e.g., when the first end 104 is inserted into the footwell 200).

Figure 7:
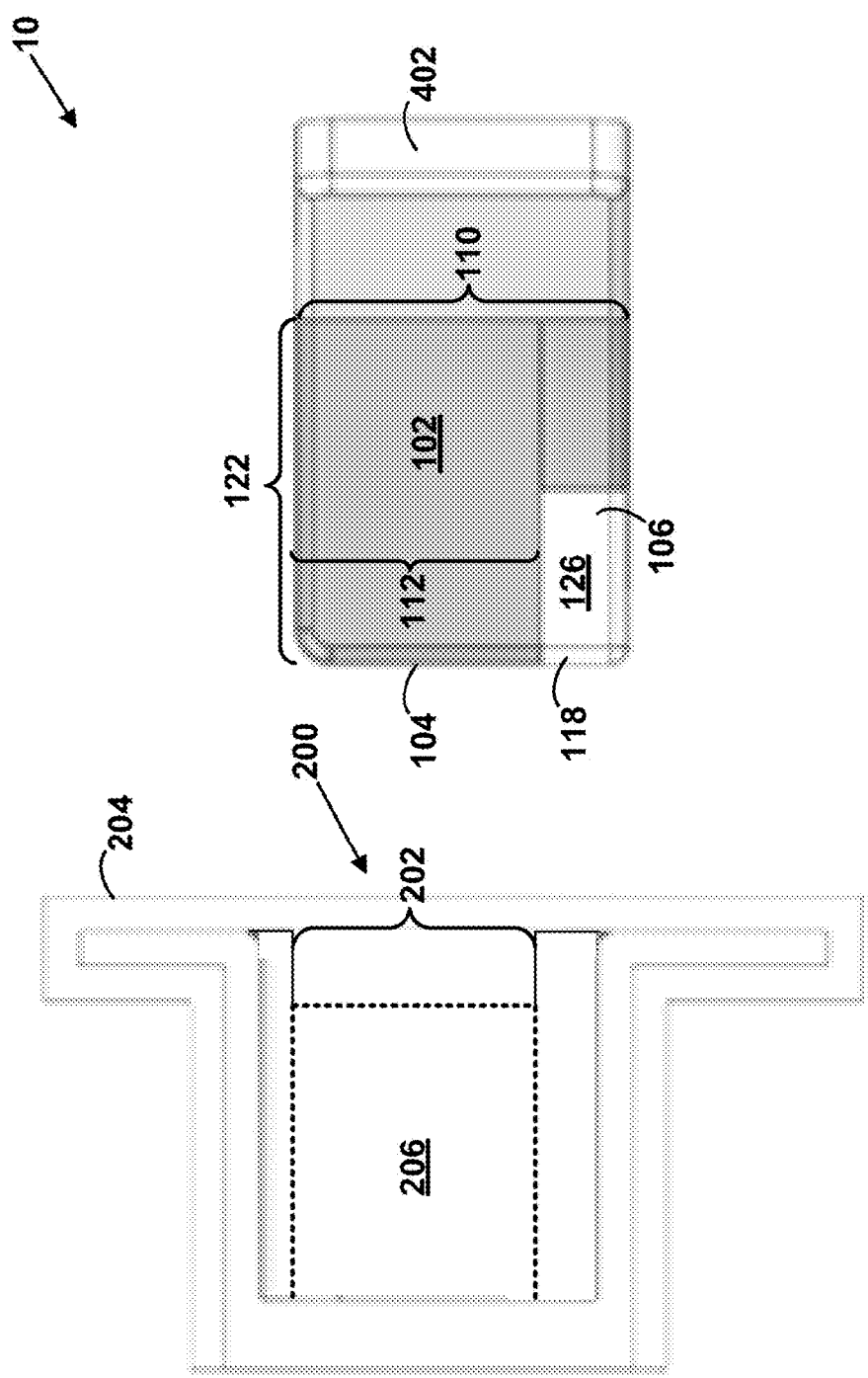
FIG. 7 is a top view of a seating system in a first position, according to an example.

FIG. 7 is a top view of the seating system 10 in the first position.

Figure 8:
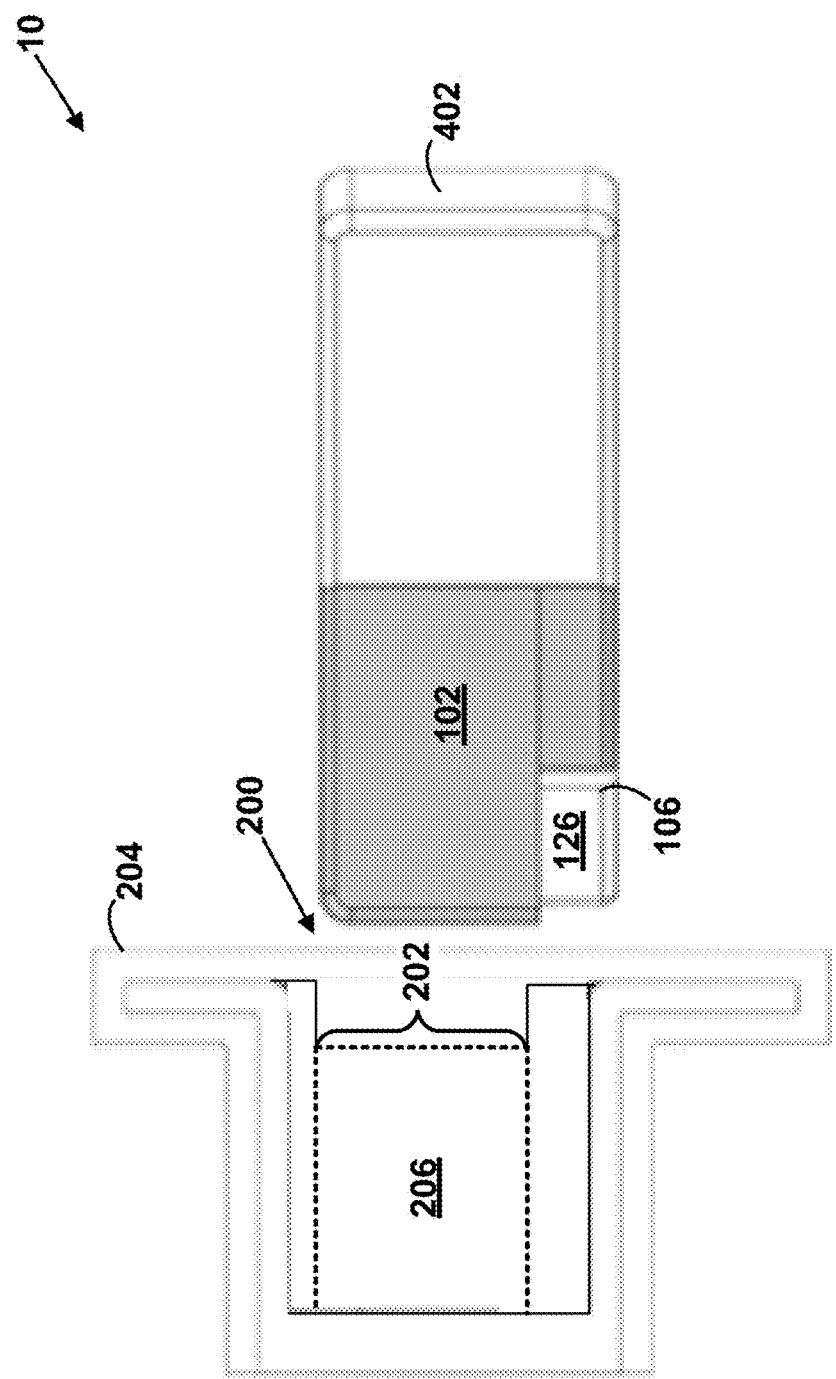
FIG. 8 is a top view of a seating system in transition between a first position and a second position, according to an example.

FIG. 8 is a top view of the seating system 10 in transition between the first position and the second position.

Figure 9:
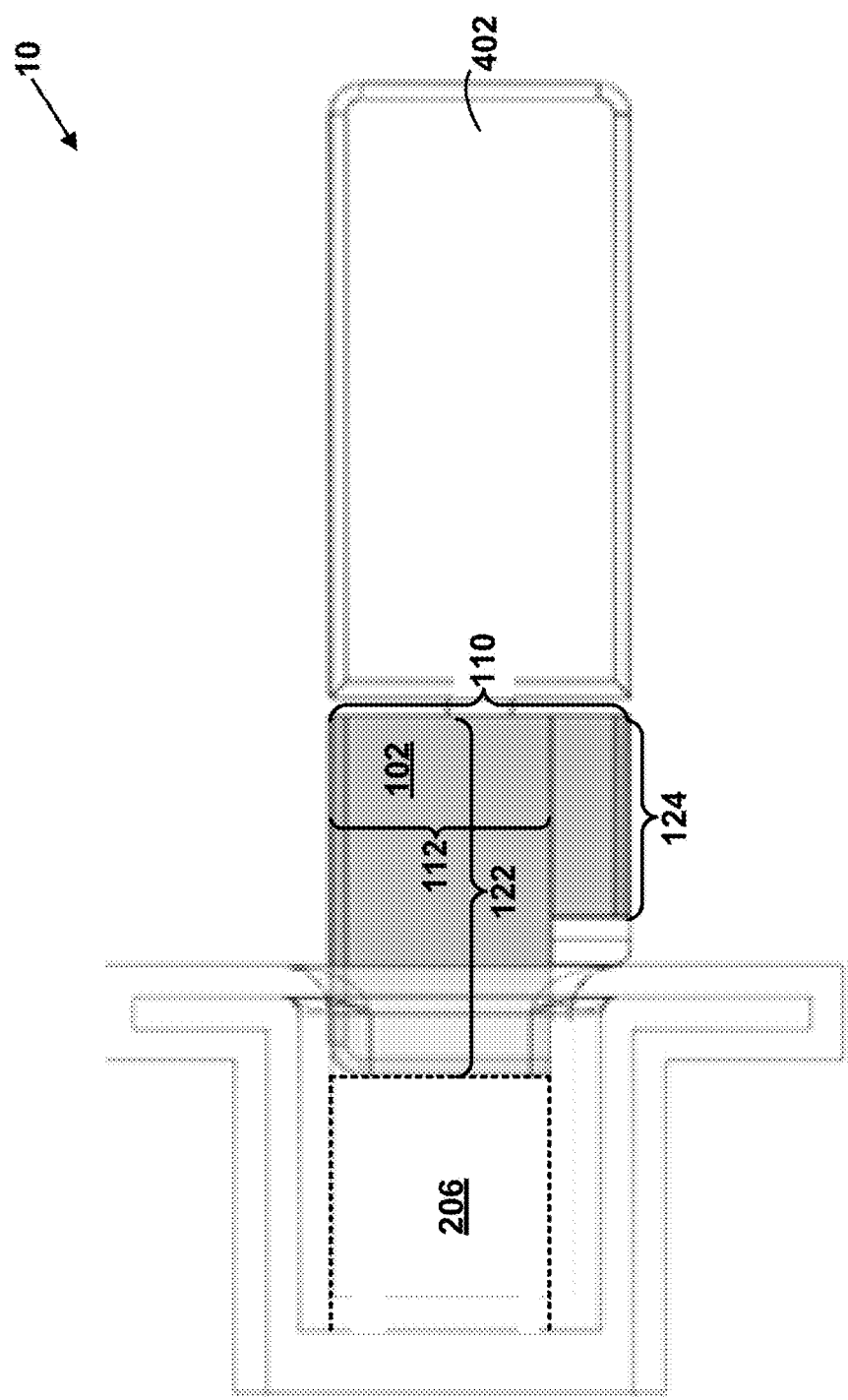
FIG. 9 is a top view of a seating system in a second position, according to an example.

FIG. 9 is a top view of the seating system 10 in the second position.

Referring to FIG. 7 and FIG. 9, a total length 122 of the seat pan 100 having the width 110 that is greater than the width 112 of the first end 104 of the first portion 102 when the second portion 106 is in the first position is greater than a total length 124 of the seat pan 100 having the width 110 that is greater than the width 112 of the first end 104 of the first portion 102 when the second portion 106 is in the second position. By transitioning from the first position to the second position, the first end 104 of the first portion 102 can be inserted into the footwell 200, as shown in FIG. 9.

As shown in FIGS. 4-9, the seating system 10 includes a platform 206 within the footwell 200. The first portion 102 is configured to abut the platform 206 and form a laying surface 208 together with platform 206 when the second portion 106 is in the second position.

Referring to FIG. 7 and FIG. 9, a total length 122 of the seat pan 100 having the width 110 that is greater than the width 202 of the footwell 200 when the second portion 106 is in the first position is greater than a total length 124 of the seat pan 100 having the width 110 that is greater than the width 202 of the footwell 200 when the second portion 106 is in the second position.

Figure 10:
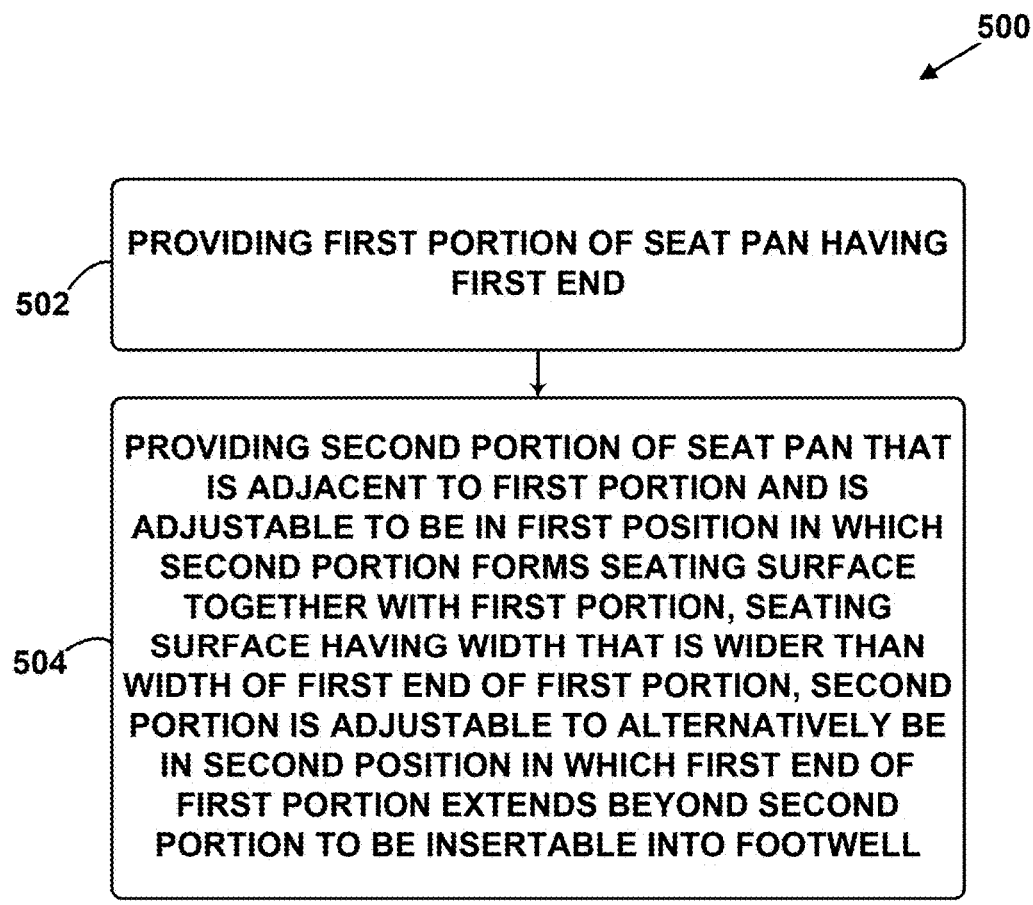
FIG. 10 is a block diagram of a method, according to an example.
Figure 16:
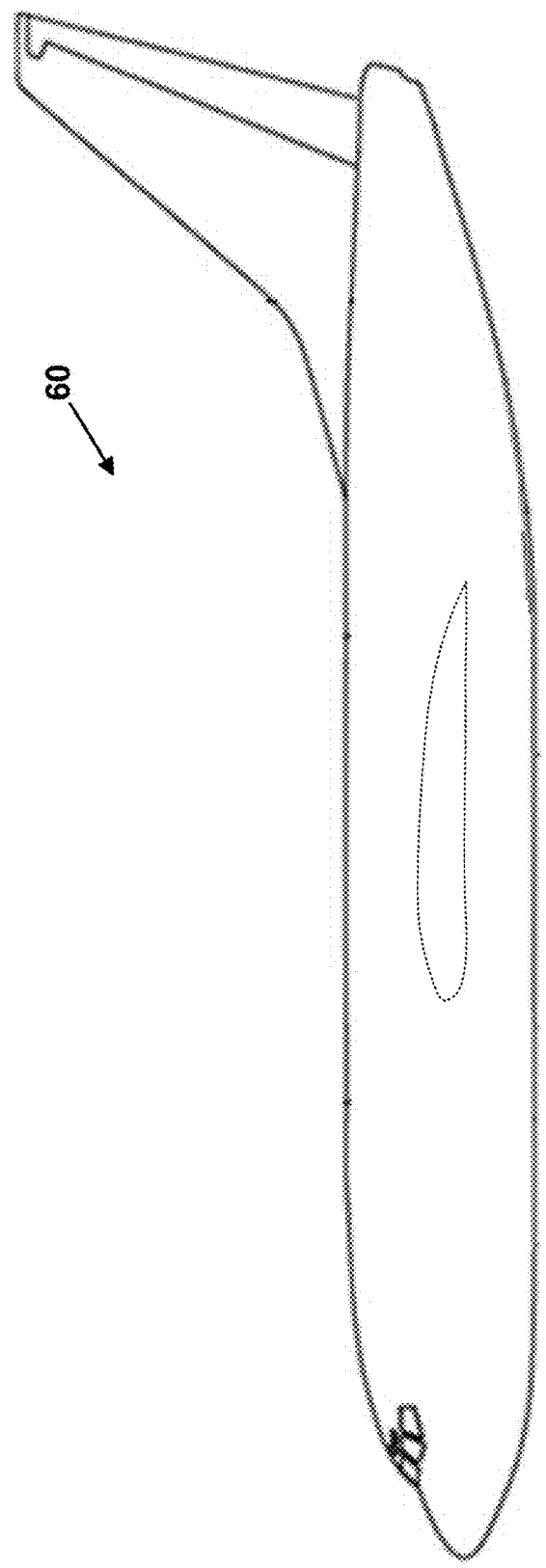
FIG. 16 is a schematic diagram of an aircraft, according to an example.
Figure 17:
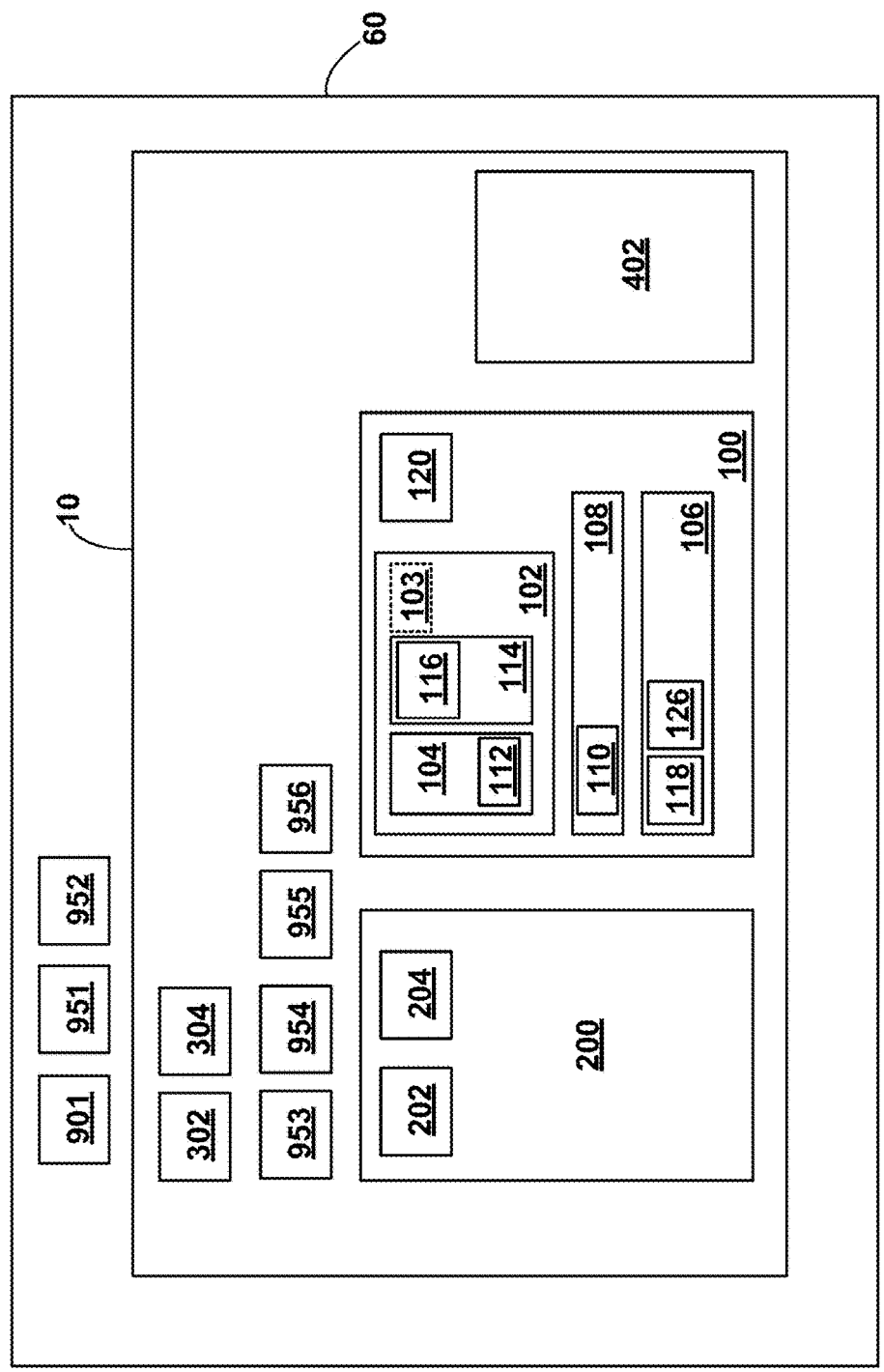
FIG. 17 is a schematic block diagram of an aircraft and a seating system, according to an example.

FIG. 10 is a block diagram of a method 500 for providing a seat pan for an aircraft (e.g., the aircraft 60 depicted in FIGS. 16 and 17).

At block 502, the method 500 includes providing a first portion of the seat pan having a first end. For example, an aircraft component supplier can manufacture or deliver the first portion 102 to an end user such as an airline.

At block 504, the method 500 includes providing a second portion that is adjacent to the first portion and is adjustable to be in a first position in which the second portion forms a seating surface together with the first portion. The seating surface has a width that is wider than a width of the first end of the first portion. The second portion is adjustable to alternatively be in a second position in which the first end of the first portion extends beyond the second portion to be insertable into a footwell. For example, the aircraft component supplier can manufacture or deliver the second portion 106 to an end user such as an airline.

Figure 11:
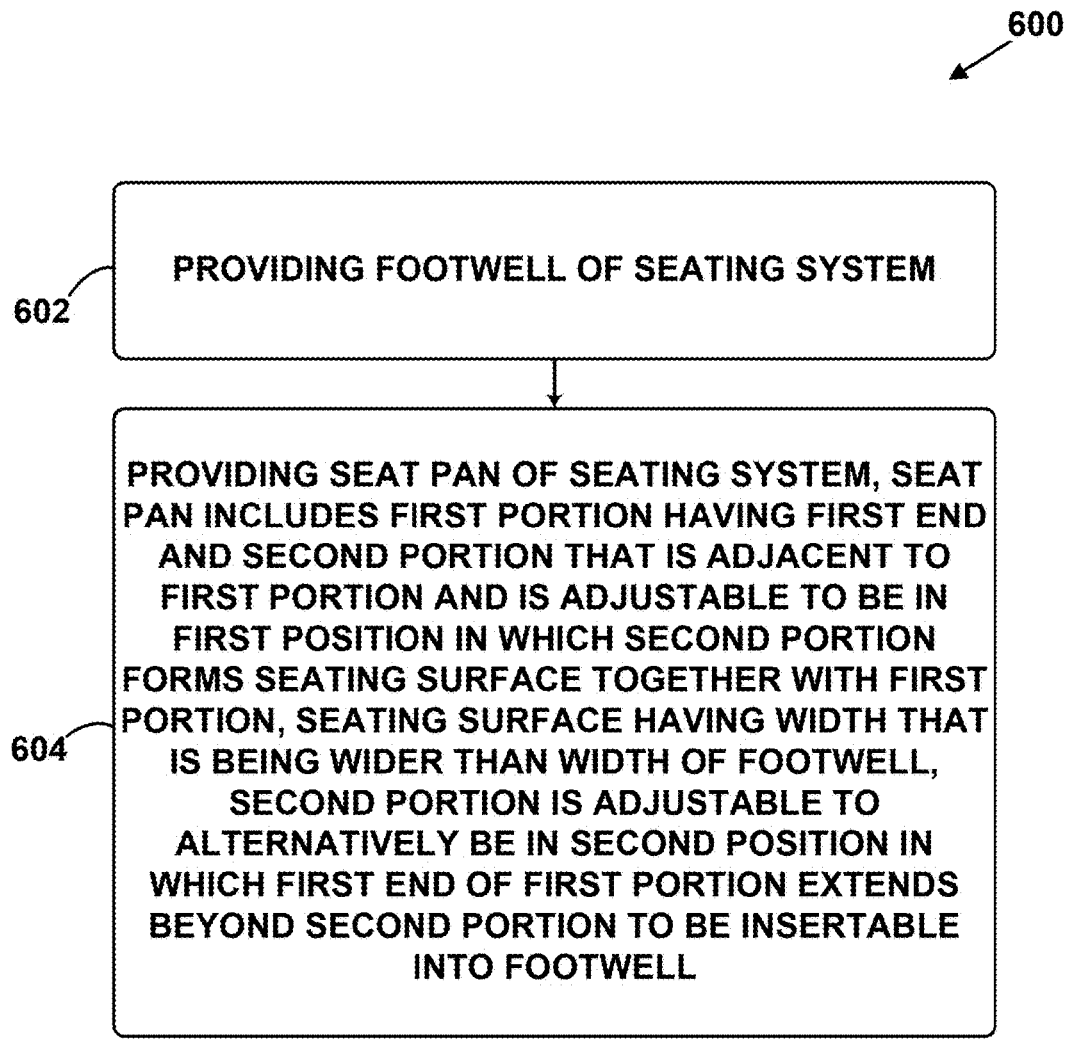
FIG. 11 is a block diagram of a method, according to an example.

FIG. 11 is a block diagram of a method 600 for providing a seating system for an aircraft (e.g., the aircraft 60 depicted in FIGS. 16 and 17).

At block 602, the method 600 includes providing a footwell of the seating system. For example, an aircraft component supplier can manufacture or deliver the footwell 200 of the seating system 10 to an end user such as an airline.

At block 604, the method 600 includes providing a seat pan of the seating system. The seat pan includes a first portion having a first end and a second portion that is adjacent to the first portion and is adjustable to be in a first position in which the second portion forms a seating surface together with the first portion. The seating surface has a width that is wider than a width of the footwell. The second portion is adjustable to alternatively be in a second position in which the first end of the first portion extends beyond the second portion to be insertable into the footwell. For example, an aircraft component supplier can manufacture or deliver the seat pan 100 to an end user such as an airline.

Figure 12:
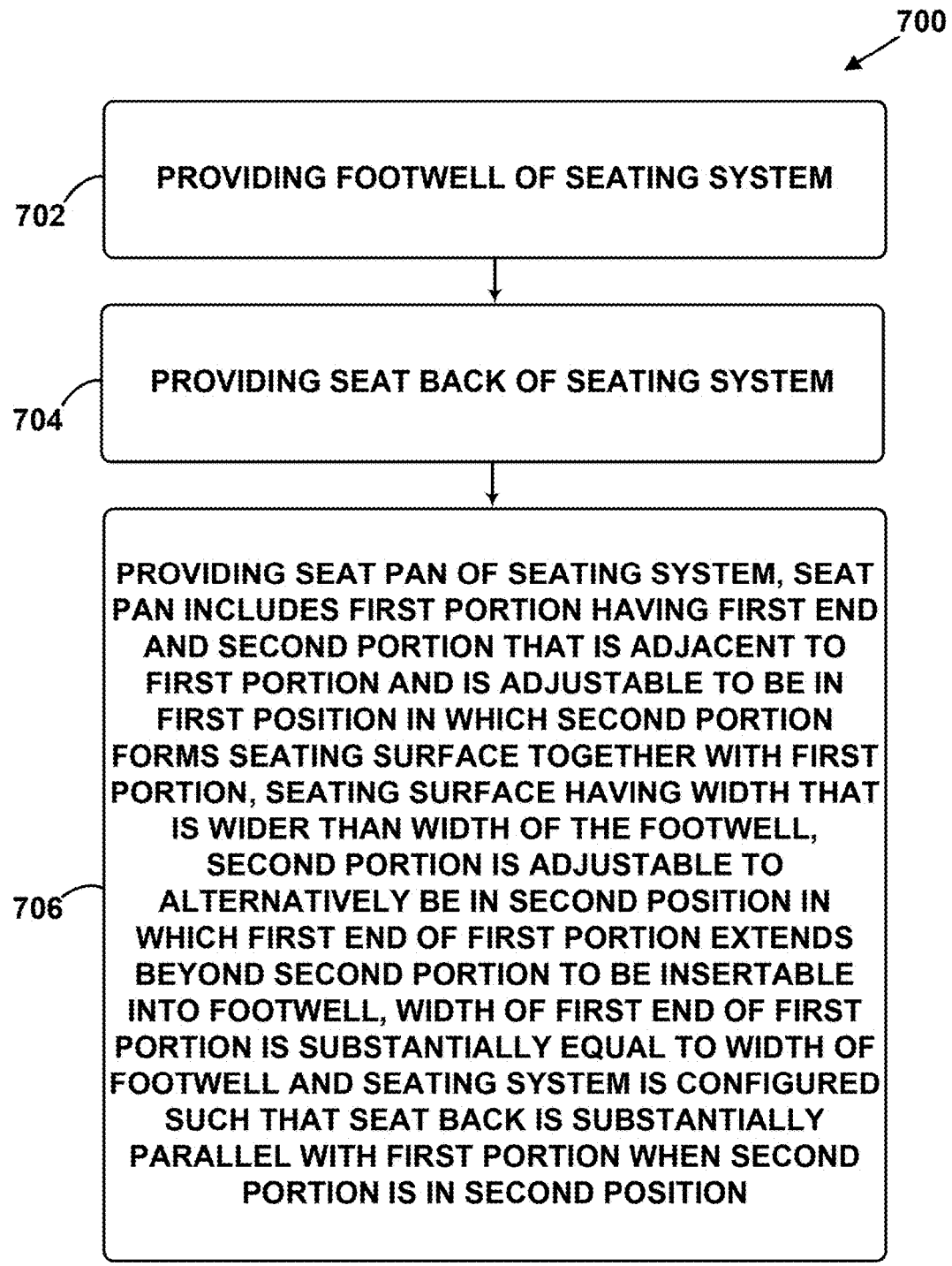
FIG. 12 is a block diagram of a method, according to an example.

FIG. 12 is a block diagram of a method 700 for providing a seating system for an aircraft (e.g., the aircraft 60 depicted in FIGS. 16 and 17).

At block 702, the method 700 includes providing a footwell of the seating system. For example, an aircraft component supplier can manufacture or deliver the footwell 200 of the seating system 10 to an end user such as an airline.

At block 704, the method 700 includes providing a seat back of the seating system. For example, an aircraft component supplier can manufacture or deliver the seat back 402 of the seating system 10 to an end user such as an airline.

At block 706, the method 700 includes providing a seat pan of the seating system. The seat pan includes a first portion having a first end and a second portion that is adjacent to the first portion and is adjustable to be in a first position in which the second portion forms a seating surface together with the first portion. The seating surface has a width that is wider than a width of the footwell. The second portion is adjustable to alternatively be in a second position in which the first end of the first portion extends beyond the second portion to be insertable into the footwell. A width of the first end of the first portion is substantially equal to the width of the footwell and the seating system is configured such that the seat back is substantially parallel with the first portion when the second portion is in the second position. For example, an aircraft component supplier can manufacture or deliver the seat pan 100 of the seating system 10.

Figure 13:
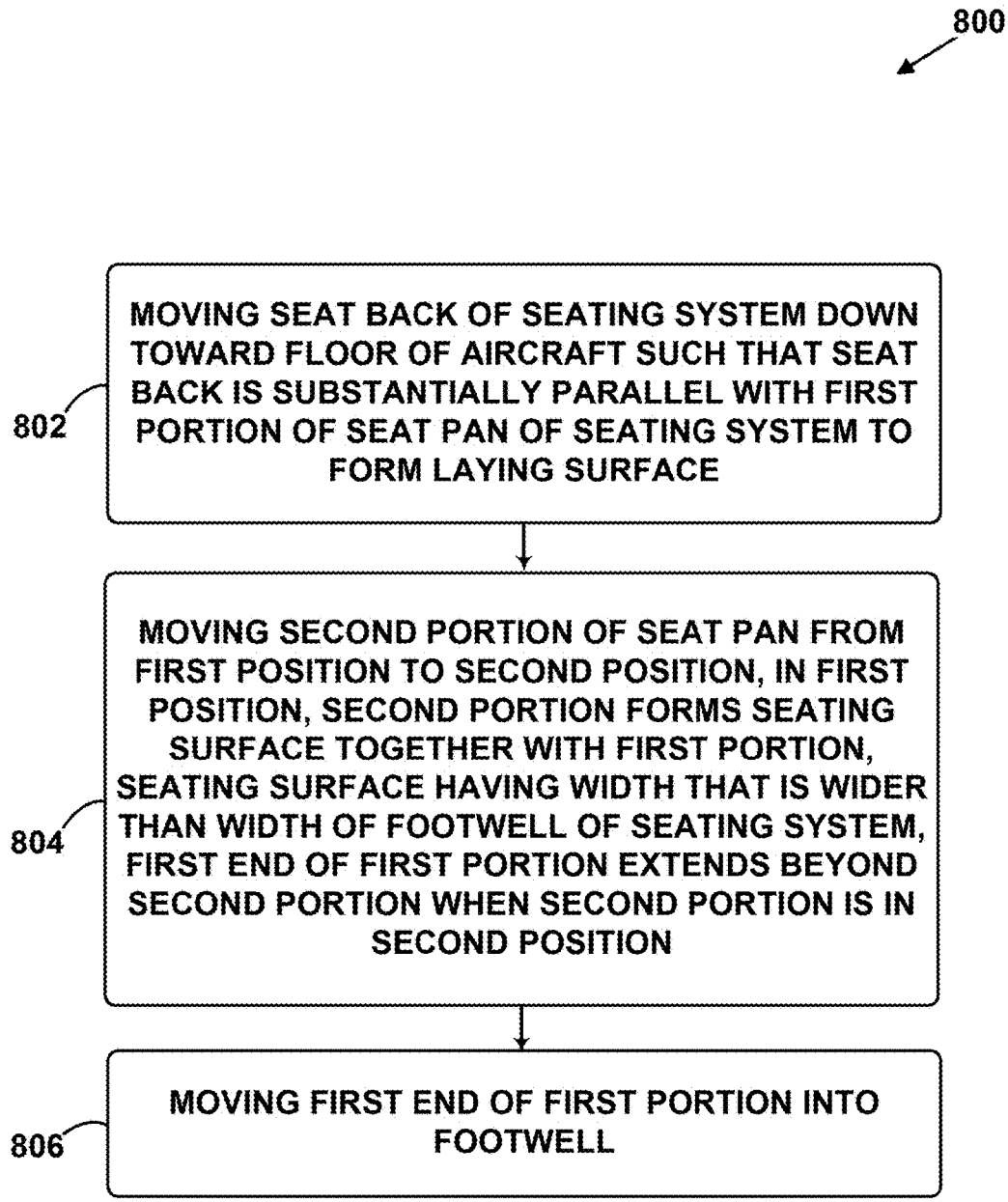
FIG. 13 is a block diagram of a method, according to an example.

FIG. 13 is a block diagram of a method 800 for adjusting a seating system of an aircraft (e.g., the aircraft 60 depicted in FIGS. 16 and 17).

At block 802, the method 800 includes moving a seat back of the seating system down toward a floor of the aircraft such that the seat back is substantially parallel with a first portion of a seat pan of the seating system to form a laying surface.

As shown in FIGS. 4-6, the seat back 402 of the seating system 10 can be moved down toward the floor 901 of an aircraft such that the seat back 402 is substantially parallel with the first portion 102 of the seat pan 100 of the seating system 10 to form the laying surface 208. The seat back 402 can be moved by operating the motorized actuator 302 or the unpowered actuator 304, for example.

At block 804, the method 800 includes moving a second portion of the seat pan from a first position to a second position. In the first position, the second portion forms a seating surface together with the first portion. The seating surface has a width that is wider than a width of a footwell of the seating system. A first end of the first portion extends beyond the second portion when the second portion is in the second position.

As shown in FIGS. 4-6, the second portion 106 can be moved from the first position (shown in FIG. 4) to the second position (shown in FIG. 6). In the first position shown in FIG. 1, the second portion 106 forms a seating surface 108 together with the first portion 102. The seating surface 108 has the width 110 that is wider than the width 202 of the footwell 200 of the seating system 10. The second portion 106 can be moved by operating the motorized actuator 302 or the unpowered actuator 304, for example.

At block 806, the method 800 includes moving the first end of the first portion into the footwell. For example, the first end 104 of the first portion 102 can be moved into the footwell 200 as shown FIG. 3, FIG. 6, and FIG. 9. The first end 104 of the first portion 102 can be moved into the footwell 200 by operating the motorized actuator 302 or the unpowered actuator 304, for example.

Figure 14:
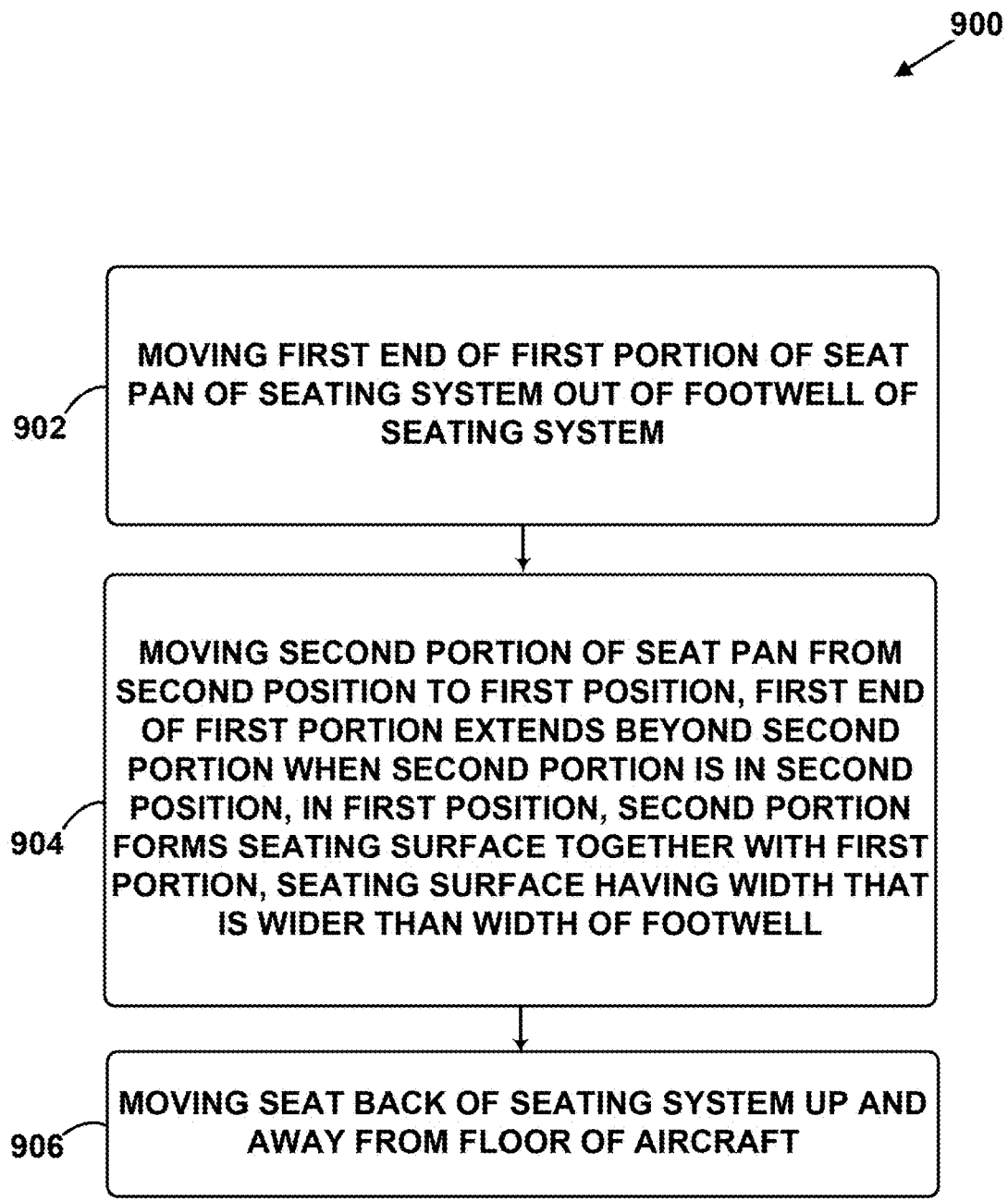
FIG. 14 is a block diagram of a method, according to an example.

FIG. 14 is a block diagram of a method 900 for adjusting a seating system of an aircraft (e.g., the aircraft 60 depicted in FIGS. 16 and 17).

At block 902, the method 900 includes moving a first end of a first portion of a seat pan of the seating system out of a footwell of the seating system.

As shown in FIG. 2 and FIG. 3, the first end 104 of the first portion 102 of the seat pan 100 can be moved out of the footwell 200. The first end 104 of the first portion 102 can be moved out of the footwell 200 by operating the motorized actuator 302 or the unpowered actuator 304, for example.

At block 904, the method 900 includes moving a second portion of the seat pan from a second position to a first position. The first end of the first portion extends beyond the second portion when the second portion is in the second position. In the first position, the second portion forms a seating surface together with the first portion, the seating surface having a width that is wider than a width of the footwell.

As shown in FIGS. 4-6, the second portion 106 can be moved from the second position (shown in FIG. 6) to the first position (shown in FIG. 4). The first end 104 of the first portion 102 extends beyond the second portion 106 when the second portion 106 is in the second position. In the first position, the second portion 106 forms a seating surface 108 together with the first portion 102. The seating surface 108 has the width 110 that is wider than the width 202 of the footwell 200. The second portion 106 can be moved by operating the motorized actuator 302 or the unpowered actuator 304, for example.

At block 906, the method 900 includes moving a seat back of the seating system up and away from a floor of the aircraft.

As shown in FIGS. 4-6, the seat back 402 of the seating system 10 can be moved up and away from the floor 901 of an aircraft such that the seating system 10 is in an upright seating position. The seat back 402 can be moved by operating the motorized actuator 302 or the unpowered actuator 304, for example.

Figure 15:
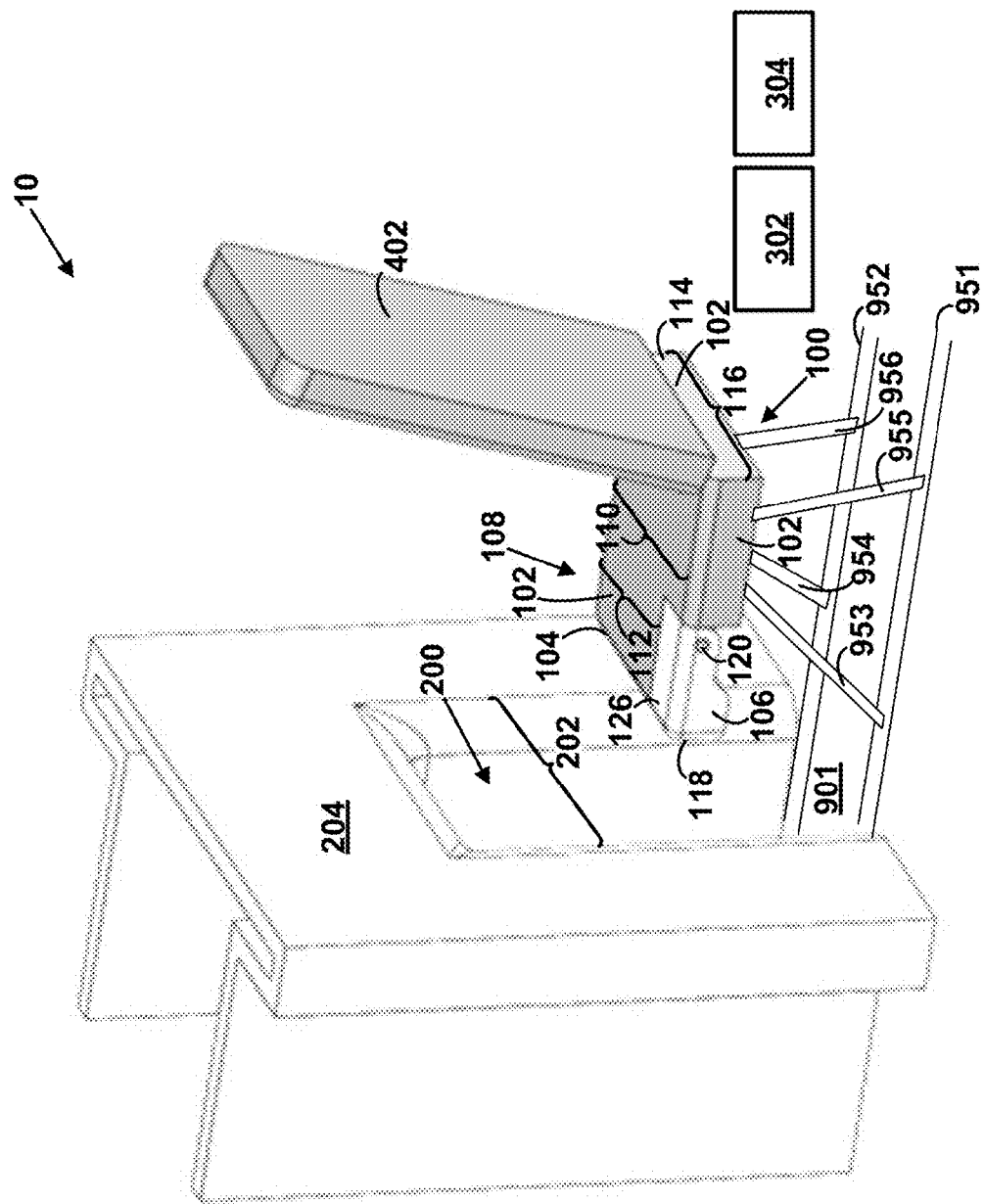
FIG. 15 is a perspective view of a seating system in a first position, according to an example.

FIG. 15 is a perspective view of an example of the seating system 10 in which the first portion 102 does not include the structural separation 103 that is shown in FIG. 1. That is, in the example shown in FIG. 15, the first portion 102 constitutes a single L-shaped portion. One of skill in the art will recognize that the example of the seating apparatus 10 shown in FIG. 15 can otherwise have any or all of the structural features and/or functionality of the seating apparatus 10 described above.

FIG. 16 is a schematic diagram of the aircraft 60.

FIG. 17 is a schematic block diagram of the aircraft 60 and the seating system 10. As shown in FIG. 17, the seating system 10 (i.e., the footwell 200, the seat pan 100, and/or the seat back 402) can be installed as part of the aircraft 60. As further shown in FIG. 17, the seating system 10 need not be arranged specifically as shown in FIG. 1 or 15.

Examples of the present disclosure can thus relate to one of the enumerated clauses (EC) listed below.

EC 1 is a seat pan for an aircraft, the seat pan comprising: a first portion having a first end; and a second portion that is adjacent to the first portion and is adjustable to be in a first position in which the second portion forms a seating surface together with the first portion, the seating surface having a width that is wider than a width of the first end of the first portion, wherein the second portion is adjustable to alternatively be in a second position in which the first end of the first portion extends beyond the second portion to be insertable into a footwell.

EC 2 is the seat pan of EC 1, wherein the width of the first end of the first portion is substantially equal to a width of the footwell.

EC 3 is the seat pan of any one of EC 1 or 2, wherein the first portion has a second end that is opposite the first end, and wherein a width of the second end is greater than a width of the first end.

EC 4 is the seat pan of any one of EC 1-3, wherein an end of the second portion is configured to pivot downward away from the first end of the first portion and toward the second end of the first portion as the second portion is adjusted from the first position to the second position.

EC 5 is the seat pan of any one of EC 1-4, further comprising a rod coupled to the first portion, the second portion being configured to pivot about the rod.

EC 6 is the seat pan of any one of EC 1-5, wherein the second portion is configured to retract away from the first end of the first portion and toward the second end of the first portion as the second portion is adjusted from the first position to the second position.

EC 7 is the seat pan of any one of EC 1-6, wherein a total length of the seat pan having a width that is greater than the width of the first end of the first portion when the second portion is in the first position is greater than a total length of the seat pan having a width that is greater than the width of the first end of the first portion when the second portion is in the second position.

EC 8 is the seat pan of any one of EC 1-7, wherein a surface of the second portion that forms the seating surface when the second portion is in the first position is substantially perpendicular to the first portion when the second portion is in the second position.

EC 9 is a seating system for an aircraft, the seating system comprising: a footwell; and a seat pan comprising: a first portion having a first end; and a second portion that is adjacent to the first portion and is adjustable to be in a first position in which the second portion forms a seating surface together with the first portion, the seating surface having a width that is wider than a width of the footwell, wherein the second portion is adjustable to alternatively be in a second position in which the first end of the first portion extends beyond the second portion to be insertable into the footwell.

EC 10 is the seating system of EC 9, wherein a width of the first end of the first portion is substantially equal to the width of the footwell.

EC 11 is the seating system of any one of EC 9-10, wherein the footwell is at least partially enclosed.

EC 12 is the seating system of any one of EC 9-11, wherein the footwell extends above and below the first portion.

EC 13 is the seating system of any one of EC 9-12, further comprising a facade that defines the footwell, wherein the second portion is configured to abut the facade when the second portion is in the second position.

EC 14 is the seating system of any one of EC 9-13, further comprising a platform within the footwell, wherein the first portion is configured to abut the platform and form a laying surface together with the platform when the second portion is in the second position.

EC 15 is the seating system of any one of EC 9-14, wherein a total length of the seat pan having a width that is greater than the width of the footwell when the second portion is in the first position is greater than a total length of the seat pan having a width that is greater than the width of the footwell when the second portion is in the second position.

EC 16 is the seating system of any one of EC 9-15, further comprising a motorized actuator that is configured to move the second portion from the first position to the second position and from the second position to the first position.

EC 17 is the seating system of any one of EC 9-16, further comprising an unpowered actuator that is configured to move the second portion from the first position to the second position and from the second position to the first position.

EC 18 is the seating system of any one of EC 9-17, further comprising a seat back, wherein the seat pan is configured such that the seat back forms an obtuse angle with the seating surface when the second portion is in the first position.

EC 19 is the seating system of any one of 9-18, further comprising a seat back, wherein the seating system is configured such that the seat back is substantially parallel with the first portion when the second portion is in the second position.

EC 20 is a seating system for an aircraft, the seating system comprising: a footwell; a seat back; and a seat pan comprising: a first portion having a first end; and a second portion that is adjacent to the first portion and is adjustable to be in a first position in which the second portion forms a seating surface together with the first portion, the seating surface having a width that is wider than a width of the footwell, wherein the second portion is adjustable to alternatively be in a second position in which the first end of the first portion extends beyond the second portion to be insertable into the footwell, wherein a width of the first end of the first portion is substantially equal to the width of the footwell, and wherein the seating system is configured such that the seat back is substantially parallel with the first portion when the second portion is in the second position.

EC 21 is a method for providing a seat pan for an aircraft. The method includes providing a first portion of the seat pan having a first end. The method also includes providing a second portion that is adjacent to the first portion and is adjustable to be in a first position in which the second portion forms a seating surface together with the first portion, the seating surface having a width that is wider than a width of the first end of the first portion. The second portion is adjustable to alternatively be in a second position in which the first end of the first portion extends beyond the second portion to be insertable into a footwell.

EC 22 is a method for providing a seating system for an aircraft. The method includes providing a footwell of the seating system and providing a seat pan of the seating system. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell.

EC 23 is a method for providing a seating system for an aircraft. The method includes providing a footwell of the seating system, providing a seat back of the seating system, and providing a seat pan of the seating system. The seat pan includes a first portion having a first end and a second portion that is adjacent to the first portion and is adjustable to be in a first position in which the second portion forms a seating surface together with the first portion, the seating surface having a width that is wider than a width of the footwell. The second portion is adjustable to alternatively be in a second position in which the first end of the first portion extends beyond the second portion to be insertable into the footwell. A width of the first end of the first portion is substantially equal to the width of the footwell and the seating system is configured such that the seat back is substantially parallel with the first portion when the second portion is in the second position.

EC 24 is a method for adjusting a seating system of an aircraft. The method includes moving a seat back of the seating system down toward a floor of the aircraft such that the seat back is substantially parallel with a first portion of a seat pan of the seating system to form a laying surface. The method also includes moving a second portion of the seat pan from a first position to a second position. In the first position, the second portion forms a seating surface together with the first portion, the seating surface having a width that is wider than a width of a footwell of the seating system. A first end of the first portion extends beyond the second portion when the second portion is in the second position. The method also includes moving the first end of the first portion into the footwell.

EC 25 is a method for adjusting a seating system of an aircraft. The method includes moving a first end of a first portion of a seat pan of the seating system out of a footwell of the seating system and moving a second portion of the seat pan from a second position to a first position. The first end of the first portion extends beyond the second portion when the second portion is in the second position. In the first position, the second portion forms a seating surface together with the first portion, the seating surface having a width that is wider than a width of the footwell. The method also includes moving a seat back of the seating system up and away from a floor of the aircraft.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A seat pan for an aircraft, the seat pan comprising:
   a first portion having a first end; and
   a second portion that is adjacent to the first portion and is adjustable to be in a first position in which the second portion forms a seating surface together with the first portion, the seating surface having a width that is wider than a width of the first end of the first portion, wherein the second portion is adjustable to alternatively be in a second position in which the first end of the first portion extends beyond the second portion to be insertable into a footwell.

2. The seat pan of claim 1, wherein the width of the first end of the first portion is substantially equal to a width of the footwell.

3. The seat pan of claim 1, wherein the first portion has a second end that is opposite the first end, and wherein a width of the second end k greater than the width of the first end.

4. The seat pan of claim 3, wherein an end of the second portion is configured to pivot downward away from the first end of the first portion and toward the second end of the first portion as the second portion is adjusted from the first position to the second position.

5. The seat pan of claim 4, further comprising a rod coupled to the first portion, the second portion being configured to pivot about the rod.

6. The seat pan of claim 3, wherein the second portion is configured to retract away from the first end of the first portion and toward the second end of the first portion as the second portion is adjusted from the first position to the second position.

7. The seat pan of claim 1, wherein a total length of the seat pan having a width that is greater than the width of the first end of the first portion when the second portion kin the first position is greater than a total length of the seat pan having a width that is greater than the width of the first end of the first portion when the second portion is in the second position.

8. The seat pan of claim 1, wherein a surface of the second portion that forms the seating surface when the second portion is in the first position is substantially perpendicular to the first portion when the second portion is in the second position.

9. A seating system for an aircraft, the seating system comprising:
a footwell; and
a seat pan comprising:
a first portion having a first end; and
a second portion that is adjacent to the first portion and is adjustable to be in a first position in which the second portion forms a seating surface together with the first portion, the seating surface having a width that is wider than a width of the footwell, wherein the second portion is adjustable to alternatively be in a second position in which the first end of the first portion extends beyond the second portion to be insertable into the footwell.

10. The seating system of claim 9, wherein a width of the first end of the first portion is substantially equal to the width of the footwell.

11. The seating system of claim 9, wherein the footwell is at least partially enclosed.

12. The seating system of claim 9, wherein the footwell extends above and below the first portion.

13. The seating system of claim 9, further comprising a facade that defines the footwell, wherein the second portion is configured to abut the facade when the second portion is in the second position.

14. The seating system of claim 9, further comprising a platform within the footwell, wherein the first portion is configured to abut the platform and form a laying surface together with the platform when the second portion is in the second position.

15. The seating system of claim 9, wherein a total length of the seat pan having a width that is greater than the width of the footwell when the second portion is in the first position is greater than a total length of the seat pan having a width that is greater than the width of the footwell when the second portion is in the second position.

16. The seating system of claim 9, further comprising a motorized actuator 302 that is configured to move the second portion from the first position to the second position and from the second position to the first position.

17. The seating system of claim 9, further comprising an unpowered actuator that is configured to move the second portion from the first position to the second position and from the second position to the first position.

18. The seating system of claim 9, further comprising a seat back, wherein the seat pan is configured such that the seat back forms an obtuse angle with the seating surface when the second portion is in the first position.

19. The seating system of claim 9, further comprising a seat back, wherein the seating system is configured such that the seat back is substantially parallel with the first portion when the second portion is in the second position.

20. A seating system for an aircraft, the seating system comprising:
footwell;
a seat back; and
a seat pan comprising:
a first portion having a first end; and
a second portion that is adjacent to the first portion and is adjustable to be in a first position in which the second portion forms a seating surface together with the first portion, the seating surface having a width that is wider than a width of the footwell, wherein the second portion is adjustable to alternatively be in a second position in which the first end of the first portion extends beyond the second portion to be insertable into the footwell, wherein a width of the first end of the first portion is substantially equal to the width of the footwell, and wherein the seating system is configured such that the seat back is substantially parallel with the first portion when the second portion is in the second position.

\* \* \* \* \*